UNITED STATES PATENT OFFICE.

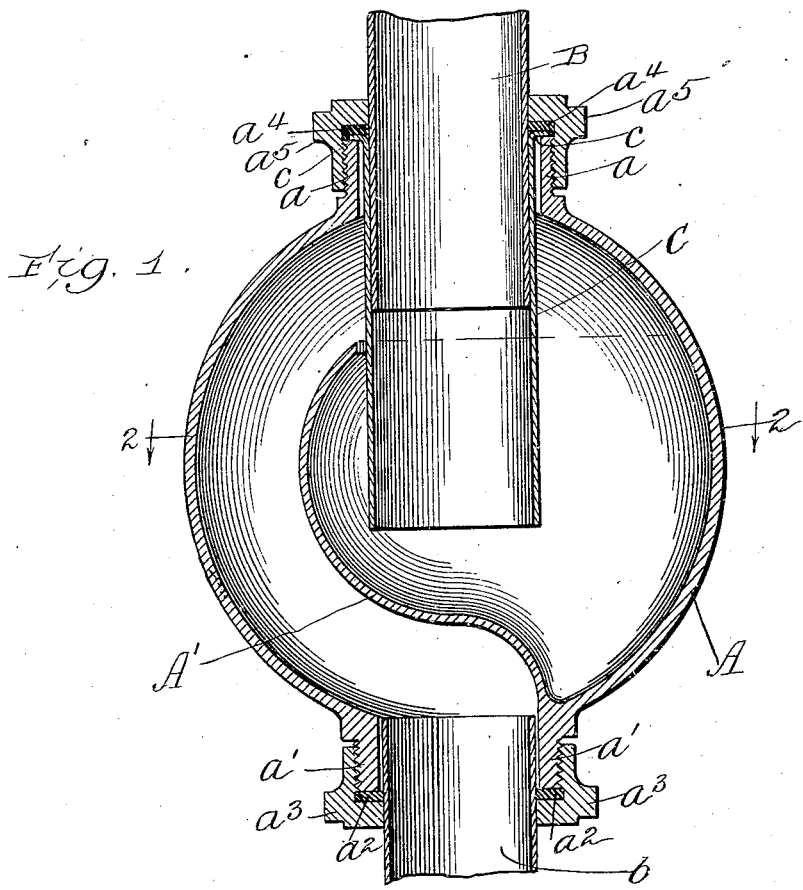
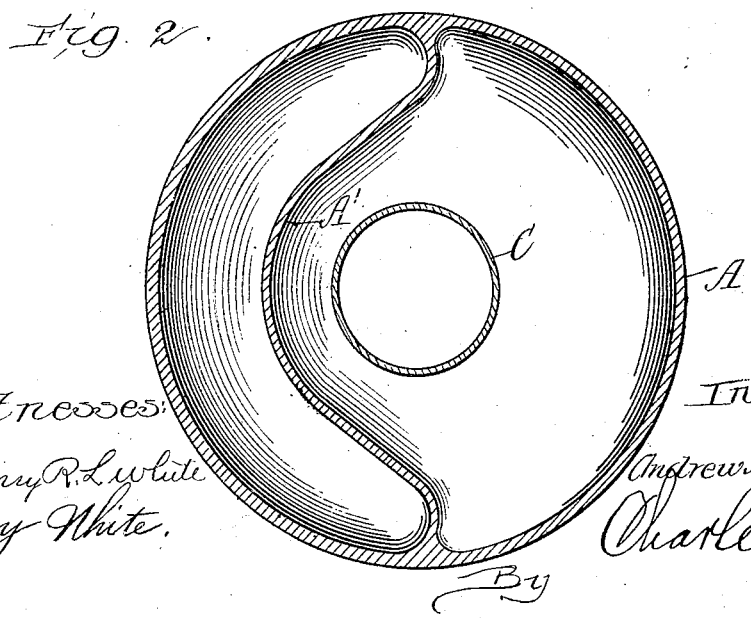

ANDREW M. MORRISON, OF DUBUQUE, IOWA.

BASIN-TRAP.

No. 875,587.  Specification of Letters Patent.  Patented Dec. 31, 1907.

Application filed June 9, 1905. Serial No. 264,404.

*To all whom it may concern:*

Be it known that I, ANDREW M. MORRISON, a citizen of the United States, and a resident of Dubuque, Dubuque county, Iowa, have invented certain new and useful Improvements in Basin-Traps; and I do hereby declare that the following is a full, clear, and exact description of the same, reference being had to the accompanying drawings, and to the letters of reference marked thereon, which form a part of this specification.

Heretofore in connecting basins and similar fixtures with the sewer or soil pipe various kinds of traps have been used some of which have been difficult to connect in place and have been unnecessarily large and unsightly.

The object of this invention is to afford a trap capable of quick and easy connection with the waste pipe from the fixture and the pipe to the sewer or soil pipe and so constructed as to insure perfect operation under all conditions.

It is a further object to avoid the necessity of cutting the pipes to exact length or threading the same for connection.

It is a further object of the invention to provide a cheap simple and durable trap of attractive appearance and in which a perfect water seal is always assured.

The invention consists in the matters hereinafter described and more fully pointed out and defined in the appended claims.

On the drawings: Figure 1 is a vertical section of a device embodying my invention showing the same connected. Fig. 2 is a section taken on line 2—2 of Fig. 1.

In said drawings: A indicates a rounded or ball shaped casing of cast metal or other material having at the top and the bottom of the same external threaded bosses $a$ and $a'$ apertured axially of the trap and into which extend the waste pipe B from the fixture and the pipe $b$ respectively leading to the sewer or soil pipe. The joints afforded between said pipes and the casing as shown, are slip joints and as shown a packing or gasket $a^2$ of rubber or any suitable material is secured around the pipe $b$ at the bottom of the casing or trap and a follower or compression nut $a^3$ which is flanged to fit closely to the pipe $b$ and engages over the gasket is threaded on the boss $a'$ and jams said packing firmly into engagement with the pipe and boss and affords a tight joint.

In the upper end of the casing and extending as shown below the center thereof, is secured a cylindric sleeve C which is flanged at its upper end and engages over the boss $a$. The waste pipe B extends into said sleeve C for a distance depending upon the length to which the pipe B is cut. A packing washer or gasket $a^4$ similar to the gasket $a^2$ fits closely around the pipe B and rests on the flange $c$, of said sleeve and the end of the boss and is held in place by follower nut $a^5$ similar to the nut $a^3$ before described.

Within the trap or casing is provided an integral partition A' which from one side of the bottom discharge aperture curves inwardly and upwardly to near the top of the casing and adjacent the opposite side thereof thus affording two compartments into the inner of which the sleeve C extends to near its bottom and from the outer of which the discharge pipe B opens.

The operation is as follows: In connecting the pipes the trap is pushed upwardly on the fixture waste pipe B, which may enter the sleeve C for any part of the length of said sleeve. The discharge pipe $b$ opens from and extends into the discharge or lower end of the trap. The follower nuts are then set up on the gaskets affording tight joints and the trap is ready for use. Each discharge of water or any liquid delivered therethrough fills the inner chamber and flows over the partition wall A' into the outer compartment of the trap and then through the delivery or discharge pipe and inasmuch as the inner chamber remains full of water beneath which the inner end of the sleeve C extends, a perfect water seal is at all times assured.

Obviously considerable variations in the adjustment of the pipes and the position of the trap is possible without affecting the perfect operation of the trap and obviously the external form of the trap and conformation of the partition may be varied as preferred without varying from the principle of my invention.

I claim as my invention.

1. A trap comprising a casing having an inlet orifice in the top thereof and an outlet orifice in the bottom thereof, an inlet pipe engaged in said inlet orifice and projecting into the casing and a partition extending upwardly from one side of the outlet orifice beneath said inlet pipe and partly around the same.

2. A trap comprising a rounded casing having oppositely disposed outlet and inlet apertures therein, externally threaded bosses through which said apertures open into the casing, a sleeve extending from the inlet aperture downwardly and a partition extending from the bottom of the casing at one side of said aperture upwardly and laterally between the apertures and having its central portion curved about said sleeve.

3. A trap comprising a globular casing having an outer and an inner chamber a complementally curved partition integral with said casing and separating said chambers, oppositely disposed inlet and outlet apertures in said casing, a sleeve removably secured in inlet aperture and extending into the inner chamber and adapted to receive therein the pipe from the fixture an outlet pipe from the trap to the sewer and means affording slip joints connecting both said pipes with the trap.

4. A trap comprising a cast globular shell having an integral complementally curved partition therein extending obliquely across or upward in the same and affording an inner and an outer chamber, a discharge pipe connected in the outer chamber by means affording a slip joint, a sleeve extending through the inlet aperture into the inner chamber and flanged at its upper end to engage outside the trap, an inlet pipe adjustable therein, a gasket on said pipe and covering the flange of said sleeve, a following nut threaded on the trap and compressing the gasket affording a slip joint connection.

In testimony whereof I have hereunto subscribed my name in the presence of two subscribing witnesses.

ANDREW M. MORRISON.

Witnesses:
 AUG. TJENDEN,
 RICHARD A. ENGLER.